US006971837B1

(12) United States Patent
Williams et al.

(10) Patent No.: US 6,971,837 B1
(45) Date of Patent: Dec. 6, 2005

(54) STACK HANDLING AND HANDWORK TABLE

(75) Inventors: Rollan Williams, Urbana, OH (US); Jared Sebree, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 5 days.

(21) Appl. No.: 10/750,514

(22) Filed: Dec. 31, 2003

(51) Int. Cl.[7] ............................................. B65G 57/00
(52) U.S. Cl. .................. 414/789.5; 254/9 C; 414/288; 414/331.01
(58) Field of Search ............................ 414/789.5, 288, 414/331.01, 331.03, 331.1, 331.11, 331.14, 414/331.18, 917; 254/9 C

(56) References Cited

U.S. PATENT DOCUMENTS

| | | | |
|---|---|---|---|
| 2,610,824 A | | 9/1952 | Grier |
| 3,174,722 A | * | 3/1965 | Alm ........................ 254/93 HP |
| 3,233,750 A | | 2/1966 | Bannon |
| 3,351,219 A | | 11/1967 | Ruderfer |
| 3,517,845 A | | 6/1970 | Martin |
| 3,648,854 A | | 3/1972 | Potter |
| 3,655,070 A | | 4/1972 | Haydu |
| 3,830,382 A | | 8/1974 | Nagamori |
| 3,843,092 A | | 10/1974 | Oehler |
| 4,362,454 A | * | 12/1982 | Kripzak ...................... 414/280 |
| 4,607,476 A | * | 8/1986 | Fulton, Jr. ................... 53/399 |
| 4,690,602 A | | 9/1987 | Castaldi et al. |
| 4,702,663 A | | 10/1987 | Mischke et al. |
| 4,741,657 A | | 5/1988 | Cassel |
| 4,786,032 A | | 11/1988 | Garman et al. |
| 5,275,521 A | * | 1/1994 | Wada .......................... 414/404 |
| 5,354,153 A | * | 10/1994 | Ottone et al. ............... 408/1 R |
| 5,479,108 A | * | 12/1995 | Cheng ......................... 324/765 |
| 5,607,276 A | * | 3/1997 | Muka et al. ........... 414/331.18 |
| 5,623,808 A | * | 4/1997 | Franklin et al. .............. 53/399 |
| 5,669,086 A | | 9/1997 | Garman |
| 5,820,539 A | * | 10/1998 | Strahm ........................ 493/412 |
| 6,257,372 B1 | * | 7/2001 | Schirmer ..................... 187/269 |
| 6,394,744 B1 | | 5/2002 | Price |
| 6,644,911 B2 | * | 11/2003 | Humble et al. ........... 414/789.5 |

* cited by examiner

*Primary Examiner*—Richard Ridley
(74) *Attorney, Agent, or Firm*—Rankin, Hill, Porter & Clark LLP; Vincent Ciamacco

(57) ABSTRACT

A part handling and handwork table including a lift assembly, a drive assembly, a stack support assembly, and a part support beam assembly. The lift assembly is raised/lowered to properly position the stack support assembly adjacent a cart containing a series of stacks, one of which is to be lifted to access a rework part incorporated therein. The drive assembly is operated to drive a movable member of the stack support assembly into the cart and beneath the stack containing the rework part. The lift is further raised and the drive assembly is reversed to carry the stack out of the cart on the movable member of the stack support assembly. The part support beam assembly is secured to the movable member and includes a manually withdrawn movable portion that defines a surface upon which parts from the stack of parts may be placed so as to access or reveal the rework part.

13 Claims, 5 Drawing Sheets

US 6,971,837 B1

STACK HANDLING AND HANDWORK TABLE

BACKGROUND OF THE INVENTION

1. Field of the Invention

The present invention generally pertains to methods and devices for unloading and loading parts or stacks of parts from a storage cart and, more particularly, toward such method and devices that provide a working surface upon which unloaded parts may be placed for repair thereof.

2. Description of the Related Art

In the manufacture of formed parts, such as stamped metal parts, it is not unusual for the formed part to have a surface imperfection that requires repair or some other remedial action before the formed part can be passed to further assembly (i.e., incorporated into a finished or semi-finished product). When the formed parts are small in size and weight or when the formed parts are manufactured in small quantities, handling and repair of imperfect parts is not a major problem.

However, when the formed parts are large (in size/weight) and manufactured in high numbers it is difficult to remove imperfect parts from a supply stream of parts. Accordingly, such imperfect parts (hereinafter referred to as rework parts) are commonly identified by visual inspection, marked as needing repair, and then stacked on a storage cart and thereby intermingled with acceptable parts. With such an arrangement, it is difficult to subsequently remove the heavy stack of parts from the cart so as to access the rework part that must be repaired. Due to the weight and size of the parts, manual handling of the stack of parts is difficult or impossible to perform in a safe manner.

Accordingly, there exists a need in the art for a method and apparatus that is adapted to remove a stack of parts from a storage cart containing plural stacks of parts so as to permit access, for repair purposes, to at least one of the parts in the stack. There further exists a need in the art for such an apparatus that provides a location for receipt of one or more parts from the stack of parts so as to access the rework part for inspection and repair purposes.

SUMMARY OF THE INVENTION

The present invention is directed toward a method and apparatus for removing a stack of parts from a storage cart containing plural stacks of parts. The present invention is further directed toward such an apparatus whereby the stack of parts, which has been removed from the cart, is initially received in a first location and wherein a second location, adjacent the first location, is provided to subsequently receive one or more of the parts from the stack of parts and thereby permit a rework part to be accessed for purposes of inspection and/or repair.

In accordance with the present invention, a table assembly includes a lift assembly, a drive assembly, a stack support assembly, and a frame. The lift assembly carries the drive assembly, stack support assembly, and the frame, and is controlled by a lift assembly controller to move vertically. The frame and a movable member of the stack support assembly are secured to one another. The drive assembly is operable, under control of a drive assembly controller, to move the frame and the movable member in the longitudinal or horizontal direction.

In further accordance with the present invention, table assembly includes a part support beam assembly and a finger assembly. The part support beam assembly includes a fixed portion that is secured to the movable member and a movable portion that is movably secured to the fixed portion. The movable portion is extended from the fixed portion and provides a surface to receive one or more parts from the stack of parts so as to gain access to the rework part for inspection and repair thereof. The finger assembly is secured to a distal end of the movable member of the stack support assembly and is operable, upon activation of a finger actuator, to move from a horizontal orientation to a vertical orientation and thereby helps to keep the stack from sliding off of the stack support assembly.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
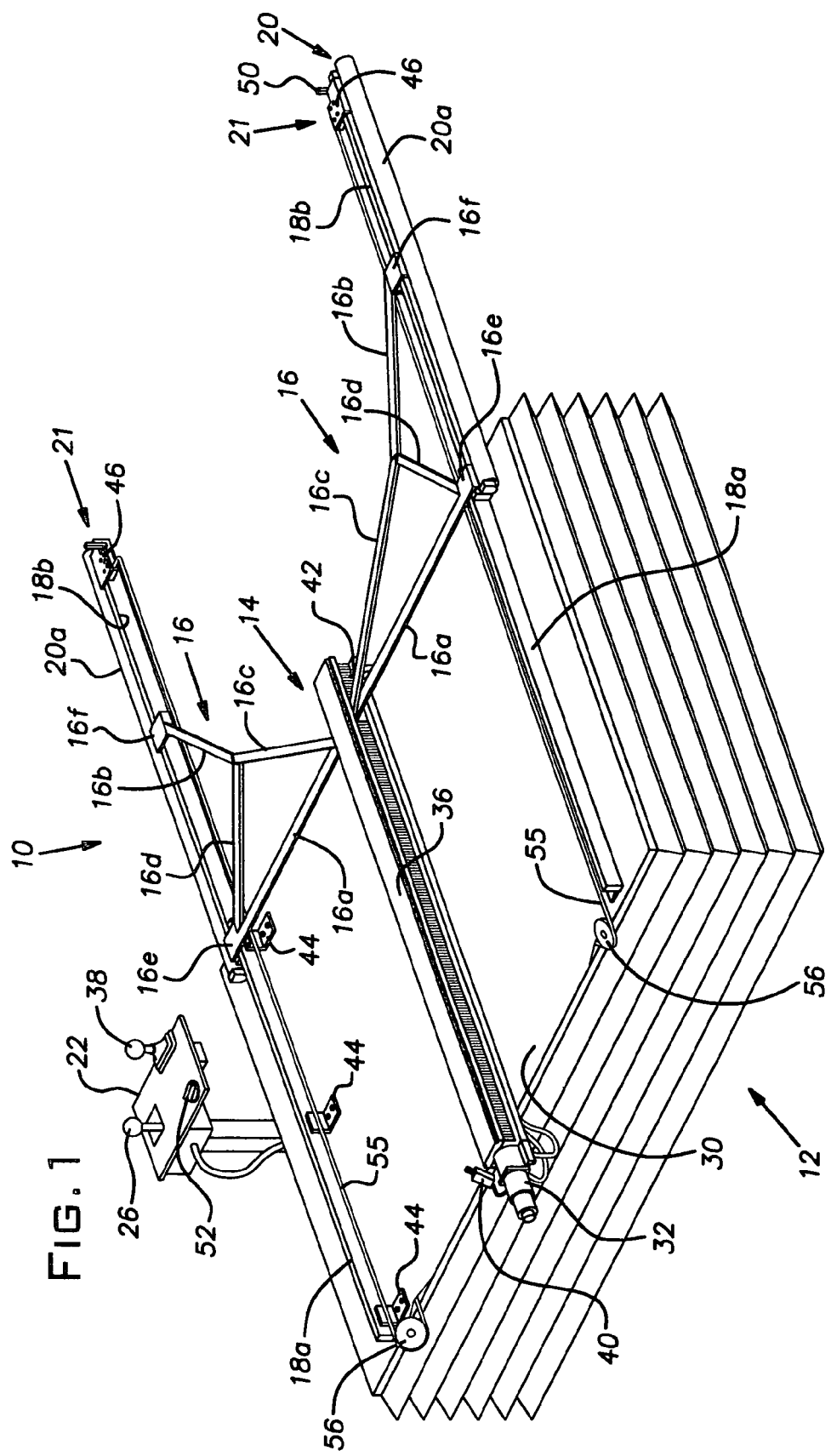
FIG. 1 is a perspective view of a stack handling and handwork table according to the present invention, with stack support rails in a fully extended position.
Figure 2:
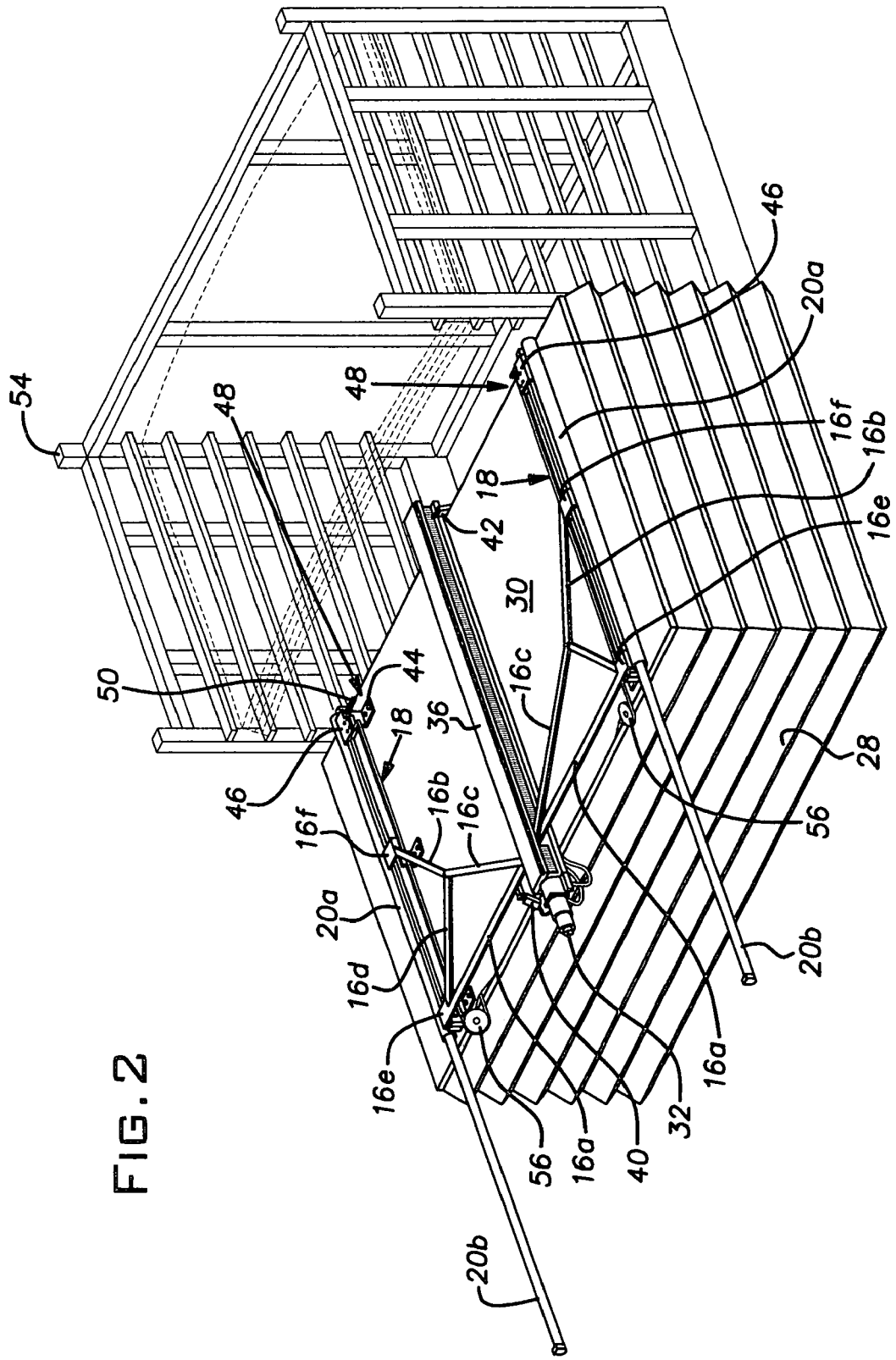
FIG. 2 is a perspective view of the table of FIG. 1, but showing the table adjacent a cart containing plural stacks of parts, and with the part support beams in a fully extended position.
Figure 3:
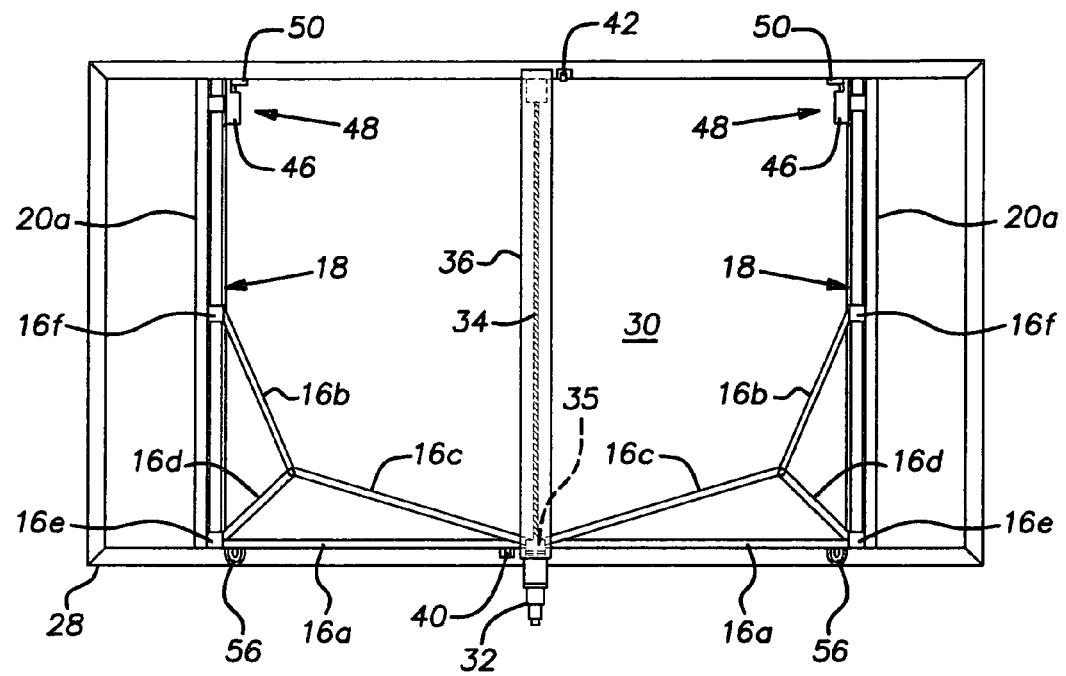
FIG. 3 is a top plan view of the table of FIG. 1, but showing the stack support rails in a fully retracted position.

The preferred embodiment of the present invention is described hereafter as it relates to a currently preferred application for the invention; for removal of stacks of metal parts, namely vehicle roof panels, from a cart containing plural stacks of vehicle roof panels and for repair of one or more of the roof panels forming the stack of roof panels. Although the following description relates to this particular application of the invention, the present invention is not limited thereto. Rather, it is considered apparent that one skilled in the art could readily adapt and customize the apparatus and method disclosed herein for use in conjunction with other parts or stacks of parts and in other environments or applications.

With reference to the drawing figures, the stack handling and handwork table 10 according to the present invention includes a lift assembly 12, a drive assembly 14, a movable frame 16, a pair of stack support assemblies 18, a pair of part support beam assemblies 20, and a pair of finger assemblies 21. A control panel 22 is disposed adjacent the table 10 and provides a series of switches or air valves 26, 38, 52 to control the flow of pressurized air to, and thus the operation of, the lift assembly 12, drive assembly 14, and finger assemblies 18, as will be described more fully hereinafter.

Figure 4:
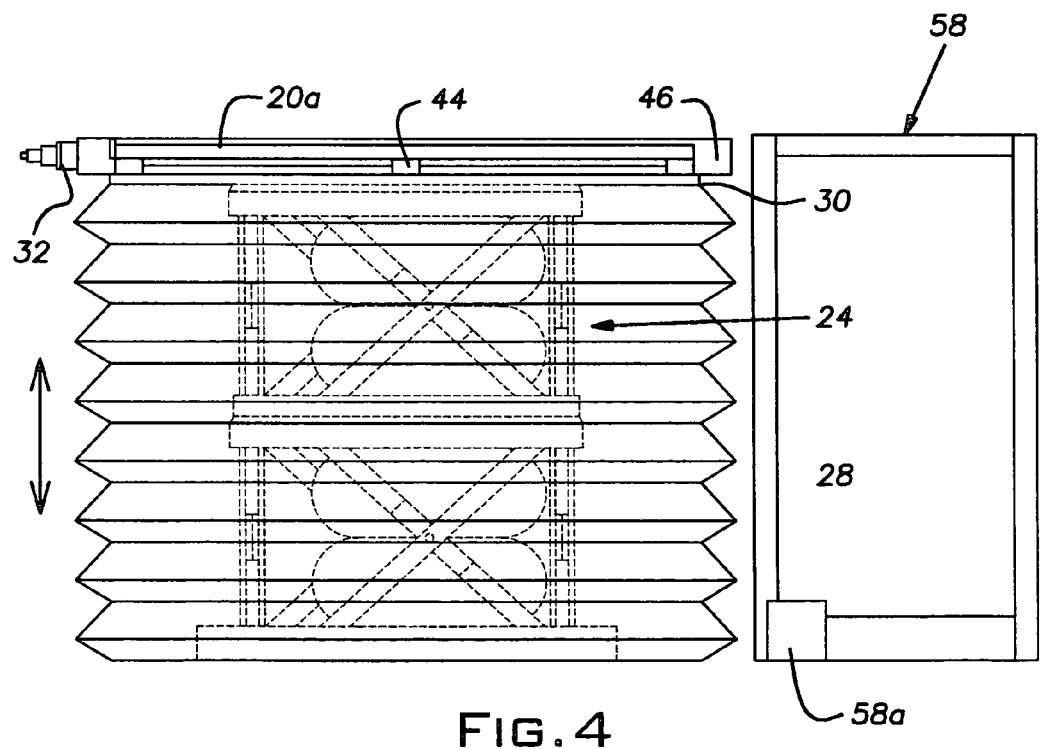
FIG. 4 is a side elevational view of the table of FIG. 1 adjacent a cart positioning device.

The lift assembly 12 is preferably a dual unit, bladder-type scissor lift device 24, such as illustrated schematically in FIG. 4. Such lift devices are known in the art and are available, for example, from Herkules Equipment Corporation of Walled Lake, Michigan. While other lifts may be used with the present invention, this type of lift device 24 offers maximum lift capacity, a minimum profile when in the lowered position, and is air-actuated, which eliminates the need for complex controllers and power connections. A lift controller or air valve 26 disposed on the control panel 22 affects movement of the lift assembly 12. The lift controller 26 is ordinarily in a neutral position, and is movable from the neutral position into either a position causing the lift assembly 12 to raise or a position causing the lift assembly 12 to lower. More specifically, the lift controller 26 affects the flow of pressurized air into/out of the bladders, as will be apparent to those skilled in the art, and thereby controls the vertical position of the lift assembly 12. The lift assembly 12 is concealed and surrounded by a flexible pleated or foldable skirt member 28, as illustrated.

The lift assembly 12 has a plate member 30 secured to a top thereof. The plate member 30 serves as a base or mounting platform to which the drive assembly 14 and stationary portions of the stack support assemblies 18 are affixed.

The drive assembly 14 includes an air motor 32, a drive screw 34, and a screw housing 36. The screw housing 36 is affixed to the plate member 30 and surrounds the drive screw 34. Preferably, the screw housing 36 has bearings (not shown) mounted at opposite ends thereof in which the drive screw 34 is rotatably mounted. Alternatively, the bearings may be provided by mounting blocks (not shown), which are directly affixed to the plate member 30, in which case the screw housing 36 simply surrounds or encloses the drive screw 34.

The air motor 32 is mounted to a proximal end of the screw housing 36, and extends away therefrom parallel to and co-axial with the screw housing 36 and the drive screw 34. As will be appreciated, lateral walls of the screw housing 36 are slotted or open (although preferably covered by a flexible barrier to reduce the introduction of dirt into the screw housing) so as to permit the movable frame 16 to extend into the screw housing 36 for driven engagement with the drive screw 34, described hereinafter.

A proximal end of the drive screw 34 is attached to a rotor (not shown) of the air motor 32 so that the air motor 32 can rotatably drive the drive screw 34. A driven ball or nut 35 is threadably disposed over the drive screw 34 and is driven along the length of the drive screw 34. The driven nut 35 is affixed to the movable frame 16, which extends through the screw housing 36, as described hereinafter, and may be considered to be a portion of the movable frame 16.

Supply of pressurized air to the air motor 32 is controlled by an air motor controller or valve 38 disposed on the control panel 22 so as to selectively rotate the drive screw 34 in either a first direction or a second direction. The air motor controller 38 is preferably normally in a neutral position, and is movable from the neutral position into either a position causing the air motor/drive screw to rotate in the first direction or a position causing the air motor/drive screw to rotate in the second direction. Rotation of the air motor 32 and drive screw 34 in a first direction causes the driven nut 35 to advance along the length of the drive screw 34 toward the distal end of the drive screw 34, which is remote from the air motor 32. Likewise, rotation of the air motor 32 and drive screw 34 in the second, opposite direction causes the driven nut 35 to advance along the drive screw 34 toward the proximal end of the drive screw 34, i.e., toward the air motor 32.

Preferably, proximal and distal limit switches 40, 42 are mounted to the screw housing 36 or the plate member 30 at the proximal and distal ends of the screw, respectively. The limit switches 40, 42 are in a position to be engaged, and thus actuated, by associated portions of the movable frame 16. Accordingly, when the movable frame 16, which is driven by the drive screw 34, reaches a predetermined position (which corresponds to a desired maximum movement of the driven nut 35 in the proximal/distal direction), the movable frame 16 will engage and actuate the corresponding limit switch 40, 42.

The limit switches 40, 42 are operable, when actuated, to cut off supply of pressurized air to the air motor 32 and thereby stop the air motor 32 and drive screw 34 from further driving the driven nut 35 and movable frame 16 in the proximal/distal direction. Actuation of the limit switches 40, 42 prevents over-driving of the nut 35 in the proximal/distal directions, and thereby prevents potential damage to the screw 34, nut 35, and/or air motor 32. The positioning of the limit switches 40, 42 also defines the extent of travel of the movable frame 16 and a movable member 18b of the stack support assemblies 18 associated therewith, described hereinafter.

The stack support assemblies 18 are identical to one another, and each includes a first, fixed member 18a and a second, movable member 18b. The movable member 18b is telescopingly slidable relative to the fixed member 18a. Such telescoping slide assemblies, which are well known in the art and available in many essentially interchangeable configurations, are available from many sources, such as Accuride International Inc., of Santa Fe Springs, Calif., or THK America, Inc., of Schaumburg, Ill.

The fixed member 18a, which is affixed to the plate member 30 by a series of mounting brackets 44, is oriented parallel to the drive screw 34. Preferably, the movable member 18b is slidably disposed on an outside surface of the fixed member 18a (i.e., on the surface of the fixed member 18a facing away from the drive screw 34). Accordingly, the movable member 18b has a first lateral side that faces toward the fixed member 18a and a second lateral side that faces away from the fixed member 18a. The second lateral side of the movable member 18b has a fixed portion 20a of the associated part support beam assembly 20 secured thereto, as is apparent from the drawings and described more fully hereinafter.

One of the finger assemblies 21 is affixed to a distal end of each movable member 18b. Each finger assembly 21 includes a mounting plate 46, an actuator 48, and a finger member 50. The mounting plate 46 secures the finger actuator 48 and the finger member 50 to the distal end of the movable member 18b, as illustrated, such that the finger actuator 48 and finger member 50 are disposed inboard of the fixed member 18a.

The finger actuator 48 is actuated by pressurized air, which is supplied via a finger member controller or switch 52 disposed on the control panel 22, to rotatably move the finger member 50 between a first orientation, which is essentially horizontal, and a second orientation, which is essentially vertical. The finger member controller 52 is preferably a two-position switch. Air hoses 55, which transmit pressurized air to the actuator from the finger member controller 52, extend along the stack support assemblies, over a pulley 56, and are taken up by a reel (not shown)

disposed beneath the plate member 30. The reels permit the air hoses 55 to extend or retract as the movable portion 18b extends or retracts. The finger member 50 is ordinarily in the first or horizontal orientation and is moved into the second or vertical orientation prior to withdrawal of a stack of parts from a cart 54, described hereinafter, and serves to hold the stack on the support assemblies 18.

The movable frame 16 connects the driven nut 35 to the movable member 18b of the stack support assemblies 18 so as to move the movable member 18b with the nut 35 as the nut 35 is driven along the drive screw 34. The movable frame 16 includes identical lateral sections. Each of the lateral sections, which extend between the nut 35 and one of the stack support assemblies 18, include a first or transverse beam 16a, a second or angled beam 16b, first and second interconnecting members 16c, 16d, and first and second mounting brackets 16e, 16f.

The first or transverse beam 16a, which is affixed to the driven nut 35, extends generally perpendicularly to and between the screw housing 36 and the associated stack support assembly 18. The first and second interconnecting members 16c, 16d extend between and interconnect the first or transverse beam 16a and the second or angled beam 16b. More specifically, one end of the first interconnecting member 16c is welded to the proximal end of the first beam 16a while the opposite or second end of the first interconnecting member 16c is welded to a proximal end of the second beam 16b. Similarly, one end of the second interconnecting member 16d is welded to the distal end of the first beam 16a while the opposite or second end of the second interconnecting member 16d is welded to the proximal end of the second beam 16b. As such, the second ends of the first and second interconnecting members 16c, 16d may be considered to be connected to one another as well as to the proximal end of the second beam 16b.

The first and second mounting brackets 16e, 16f have a generally inverted U-shape and are designed to interconnect the first and second beams 16a, 16b, respectively, with the movable member 18b of the stack support assembly 18. As such, the first mounting bracket 16e is affixed to a distal end of the first beam 16a, extends over the fixed member 18a, and is secured to the movable member 18b of the associated stack support assembly 18 so that the movable member 18b is connected to, and moves integrally with, the first beam 16a. Similarly, the second mounting bracket 16f is affixed to a distal end of the second beam 16b, extends over the fixed member 18a, and is secured to the movable member 18b of the associated stack support assembly 18 so that the movable member 18b is connected to, and moves integrally with, the second beam 16a.

Each of the part support beam assemblies 20 includes the fixed portion 20a, which is secured to the movable member 18b of the associated stack support assembly 18, and a movable portion 20b. In the illustrated and preferred embodiment, the fixed portion 20a is formed as a cylindrical hollow tube or pipe in which the movable portion 20b, also formed as a cylindrical hollow tube or pipe, is telescopingly received. Preferably, the fixed portion 20a and the movable portion 20b include structures, such as extending flanges or lips, that cooperate to prevent the movable portion 20b from being entirely pushed into the fixed portion (which would make withdrawal therefrom difficult) or from being totally pulled out of the fixed portion. For example, the movable portion 20b may have a length that is greater than the length of the fixed portion 20a, and the fixed portion 20a may have a closed distal end, thereby preventing the movable portion 20b from being entirely pushed into the fixed portion 20a.

Similarly, the distal end of the movable portion 20b may have an outwardly extending flange that engages an inwardly extending flange at the proximal end of the fixed portion 20a so as to prevent the movable portion 20b from being completely withdrawn from the fixed portion 20a. It is believed that numerous equivalent structures for non-removably and slidably securing the movable portion 20b to the fixed portion 20a are known to those skilled in the art, and may be used interchangeably herein without departing from the scope and spirit of the present invention.

Figure 5:
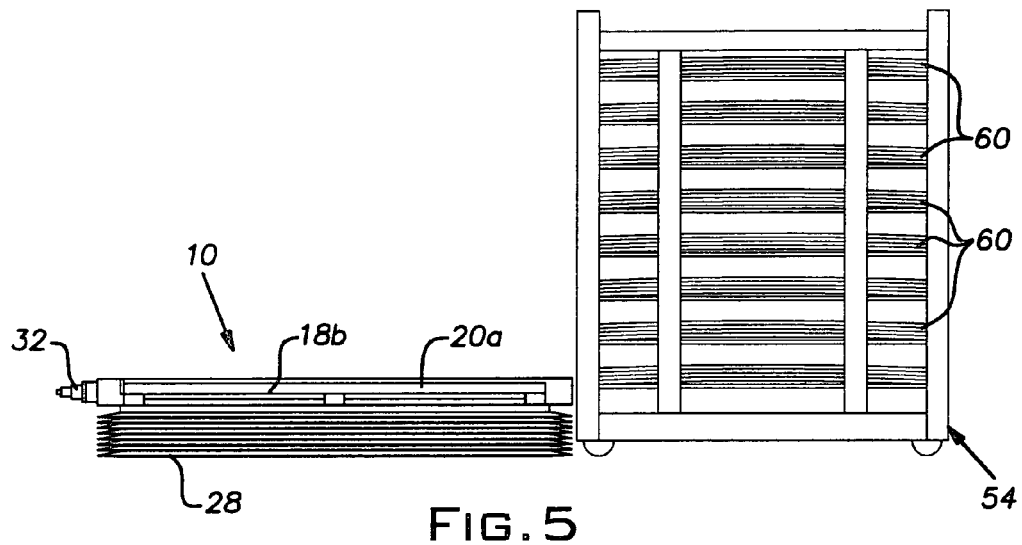
FIG. 5 is a side elevational view of the table next to a cart upon which are placed plural stacks of parts, with the table in a collapsed condition.

Use of the table 10 in handling stacks of formed parts, and for use as a work surface to repair such parts, is described hereinafter. Initially, it is noted that the table 10 is in an "at rest" position whereby the stack support assemblies 18 and the part support beam assemblies 20 are in a retracted position. Further, the finger members 50 are in their normal, horizontal orientation. Accordingly, the table 10 is generally in the configuration as illustrated in FIGS. 4–5. It is further noted that a cart positioning device 58, which is schematically illustrated only in FIG. 4, is disposed adjacent the table 10 and includes a cart lock 58a by means of which the cart 54 is positively positioned relative to the table 10. Such positioning devices and locks are known in the art.

A cart 54 containing plural stacks of parts 60, such as vehicle roof panels, is positioned next to the table 10 and locked into position using the cart lock 58a. The operator, who is standing at the control panel 22, identifies the stack 60' that needs to be taken out of the cart 54, and operates the lift controller valve 26 so as to raise/lower the lift assembly 12 and thereby position the movable members 18b of the stack support assemblies 18 in a position to be inserted between the stack 60' to be taken out of the cart and the immediately subjacent stack of parts 60". It will be appreciated that the structure of the stack support assemblies is adapted to the weight of the stack of parts (i.e., between 200–400 pounds), the span or unsupported extension (i.e., 60 inches+), and the limited space between adjacent stacks (4–6 inches).

Figure 6:
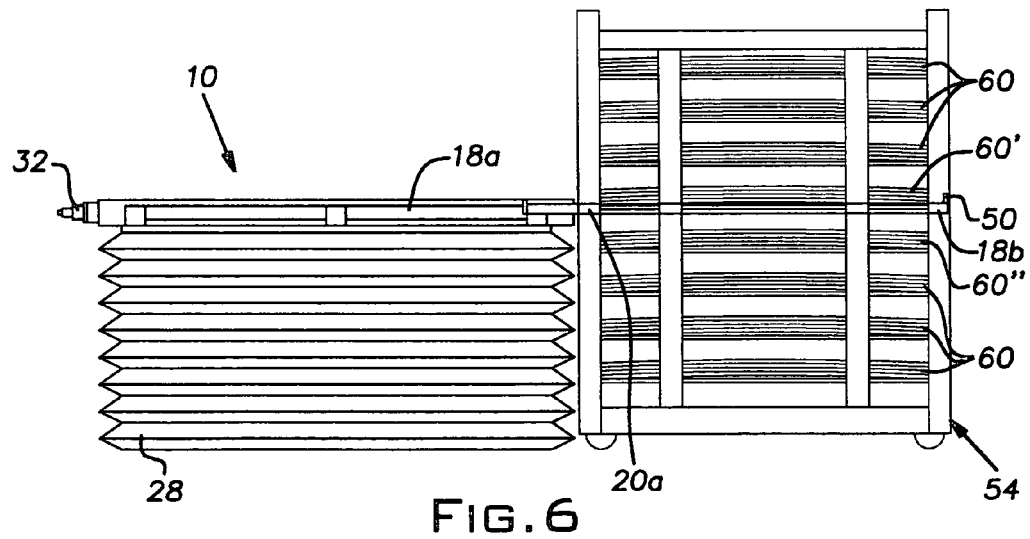
FIG. 6 is a side elevational view of the table similar to FIG. 5, but showing the table in a relatively extended position with the stack support rails extending into the cart to withdraw a stack of parts from the cart.
Figure 7:
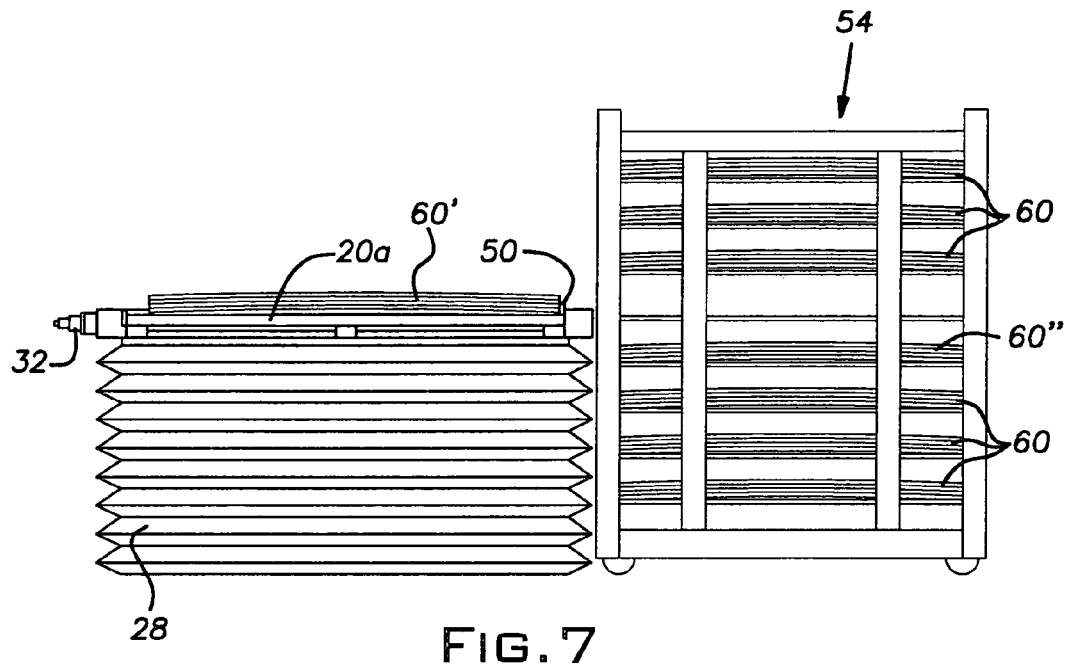
FIG. 7 is similar to FIGS. 5–6, but shows the stack support rails in a retracted position and supporting the stack of parts that was taken from the cart; and, FIG. 8 is similar to FIG. 7, but shows a part, which was taken from the supported stack of parts, disposed on the now extended part support beams.

In any event, with the lift assembly 12 operated into a position in which the stack support assemblies 18 are in a vertical position immediately beneath, but spaced laterally from, the stack 60' to be withdrawn from the cart 54, the air motor controller 38 is operated to drive the air motor 32 and drive screw 34 in a first direction, whereby the driven nut 35, movable frame 16, and movable members 18b of the stack support assemblies 18 are driven relatively away from the air motor 32. The movable members 18b extend into and through the cart 54, immediately beneath the stack 60' to be removed. At the maximum extension of the movable members 18b, i.e., when the distal limit switch 42 is engaged by the frame 16, the movable members 18b have extended to the point that the finger assembly 21 is disposed on the opposite side of the stack 60'. Thus, actuation of the finger assembly actuator 48 by operation of the finger member controller 52 rotates the finger member 50 into the vertical orientation whereby the finger member 50 can assist in retaining the stack 60' on the support assemblies 18 as the stack 60' is first lifted and then withdrawn from the cart 54. Thereafter, the lift assembly controller 26 is manipulated to first raise the stack support assemblies 18 into engagement with the stack 60' (FIG. 6), and then to lift the stack 60'. When the stack 60' is completely supported by the stack support assemblies 18, the lift assembly controller 26 is left alone while the air motor controller 38 is operated to drive the air motor 32 and the drive screw 34 in the second direction so as to cause the movable frame 16 and the movable member 18b of the stack support assemblies 18 to move toward the air motor. When the proximal limit switch 40 is actuated by engagement with the movable frame 16, the stack 60' is disposed over the plate member 30 and withdrawal of the stack 60' from the cart 54 is complete.

Thereafter, the location of the rework part within the stack 60' is determined. Assuming that the rework part is not disposed on top of the stack 60', the movable portions 20b of the part support beam assemblies 20 are manually withdrawn or pulled out of the fixed portions 20a so as to define or provide a surface upon which one or more parts (i.e., a substack 61) from the stack 60' may be placed so as to gain access to the rework part to be repaired. In this configuration, the movable portions 20b extend away from the proximal end of the table 10.

Figure 8:
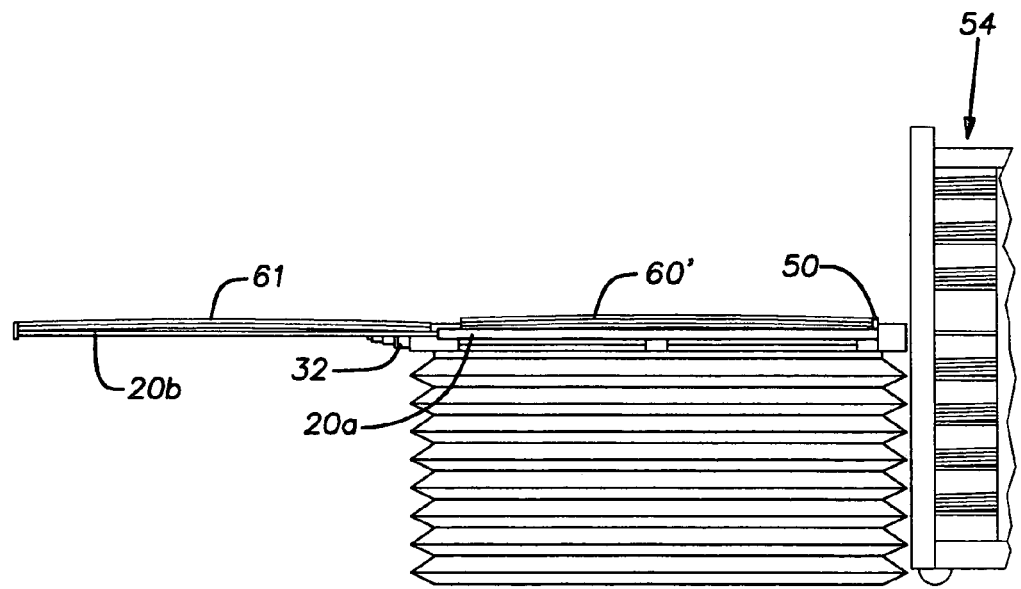

Again, assuming that the rework part is not located on top of the stack 60', the substack 61 (i.e., the parts on top of the rework part) is removed from the stack 60' and placed on the movable portions 20b of the part support beam assemblies 20. In the illustrated embodiment shown in FIG. 8, the rework part is the third (i.e., middle) part of a stack 60' containing five parts. Accordingly, by removing the substack 61, which consists of the top two parts in this example, from the stack 60', the rework part is revealed and is accessible for repair purposes.

Naturally, it is contemplated that, should the rework part be located on top of the stack 60', it will not be necessary to move any parts from the stack 60' in order to access the rework part. It is further contemplated that, if there is more than one rework part within the stack 60', it may be desirable to place one rework part on the movable portions 20b (i.e., on top of the substack 61) while another rework part is disposed on top of the stack 60', thereby making it possible to repair multiple rework parts at the same time. In any event, the lift controller valve 26 may be operated to move the table 10 into a vertical position that is convenient or comfortable for the operator to work on the rework part. Once the rework part is repaired, and the substack 61 is returned to the stack 60', the complete stack 60' is again on the movable members 18b, the aforementioned steps are reversed to return the stack 60' to the cart 54.

Accordingly, the present invention permits a heavy stack of parts to be accessed and removed from a cart without significant manual intervention by the operator. Moreover, the present invention permits a rework part contained within a stack of parts to be safely and easily accessed and positioned for repair.

What is claimed is:

1. A table assembly, comprising:
   a lift assembly;
   a drive assembly disposed on said lift assembly and vertically movable with said lift assembly, said drive assembly including a driven element that is movable longitudinally;
   a stack support assembly disposed on said lift assembly and vertically movable with said lift assembly, said stack support assembly comprising a movable member;
   a frame that interconnects said movable member with said drive assembly so as to cause said movable member to move with said driven element, whereby said movable member is selectively extended from said stack support assembly by operation of said drive assembly; and,
   a finger member, disposed on a distal end of said movable member, and operable to move between a first orientation and a second orientation.

2. The table assembly according to claim 1, further comprising a part support beam assembly, said part support beam assembly including a fixed portion that is secured to said movable member and a movable portion that is movably secured to said fixed portion.

3. The table assembly according to claim 1, wherein said first orientation is generally horizontal and said second orientation is generally vertical, to prevent the item from sliding horizontally off of said movable member.

4. The table assembly according to claim 1, further comprising:
   a lift controller that is operable to raise and lower said lift assembly; and,
   a drive controller that is operable to activate said drive assembly.

5. The table assembly according to claim 4, wherein said first orientation is generally horizontal and said second orientation is generally vertical.

6. The table assembly according to claim 5, further comprising a finger member controller that is operable to move said finger assembly member between said first and second orientations.

7. The table assembly according to claim 6, further comprising a part support beam assembly, said part support beam assembly including a fixed portion that is secured to said movable member and a movable portion that is movably secured to said fixed portion.

8. A table assembly, comprising:
   a lift assembly;
   a lift assembly controller that is operable to move said lift assembly vertically;
   a drive assembly disposed on said lift assembly and vertically movable with said lift assembly, said drive assembly including a driven element that is movable longitudinally;
   a stack support assembly disposed on said lift assembly and vertically movable with said lift assembly, said stack support assembly comprising a movable member;
   a frame that interconnects said movable member with said drive assembly so as to cause said movable member to move with said driven element;
   a drive assembly controller that is operable to move said driven element and said movable member longitudinally so as to selectively extend said movable member from said stack support assembly; and
   a part support beam assembly, said part support beam assembly including a fixed portion that is secured to said movable member and a movable portion that is movably secured to said fixed portion.

9. The table assembly according to claim 8, further comprising:
   a finger assembly, said finger assembly including a finger member that is disposed on a distal end of said movable member and operable to move between a first orientation and a second orientation; and,
   a finger member controller that is operable to move said finger assembly between said first and second orientations.

10. The table assembly according to claim 9, wherein said first orientation is generally horizontal and said second orientation is generally vertical.

11. A method for positioning a rework part, which is contained within a stack of parts, for repair on a table assembly, the stack of parts being one of a plurality of stacks of parts disposed upon a cart, comprising the steps of:
   positioning the cart adjacent the table assembly;
   lifting said table assembly to place a stack support assembly of said table assembly in a vertical position immediately beneath the one stack of parts;

driving a movable member of said stack support assembly horizontally in a first direction so that said movable member extends transverse and beneath said one stack of parts;

further lifting said table assembly so as to engage said stack support assembly with said one stack of parts and thereby lifting said one stack of parts;

moving a finger member, which is disposed on a distal end of said movable member, into a vertical orientation to prevent said one stack of parts from sliding off of said movable member; and, driving said movable member of said stack support assembly horizontally in a second, opposite direction so as to withdraw said movable member and said one stack of parts from said cart.

12. The method according to claim 11, comprising the further steps of:

longitudinally extending a movable portion of a part support beam assembly; and, placing at least one part of said one stack of parts on said movable portion so as to access said rework part within said one stack of parts for repair thereof.

13. The method according to claim 11, comprising the further step of:

adjusting a vertical position of said lift assembly so as to place said rework part in a convenient location for repair thereof.

* * * * *

UNITED STATES PATENT AND TRADEMARK OFFICE
CERTIFICATE OF CORRECTION

PATENT NO.    : 6,971,837 B1
DATED         : December 6, 2005
INVENTOR(S)   : Williams et al.

It is certified that error appears in the above-identified patent and that said Letters Patent is hereby corrected as shown below:

<u>Column 8,</u>
Line 18, after "finger", delete "assembly".

Signed and Sealed this

Seventh Day of March, 2006

JON W. DUDAS
*Director of the United States Patent and Trademark Office*